D. F. FETTER.
Assignor, by mesne assignments, to EXCELSIOR DRIVE-SCREW AND BOLT CO.
Drive-Screw.
No. 8,121. Reissued March 12, 1878.
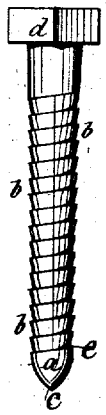
Witnesses:
B. E. Clark
Theodore L. Wooster
Inventor:
David F. Fetter
By D. C. Ketch
his atty.

UNITED STATES PATENT OFFICE.

DAVID F. FETTER, OF NEW YORK, N. Y., ASSIGNOR, BY MESNE ASSIGNMENTS, TO EXCELSIOR DRIVE SCREW AND BOLT COMPANY, OF SAME PLACE.

IMPROVEMENT IN DRIVE-SCREWS.

Specification forming part of Letters Patent No. 110,839, dated January 10, 1871; Reissue No. 8,121, dated March 12, 1878; filed December 31, 1877.

*To all whom it may concern:*

Be it known that I, DAVID F. FETTER, of the city, county, and State of New York, have invented a new and Improved Wood-Screw; and I do hereby declare that the following is a full, clear, and exact description of the same, reference being had to the accompanying drawing, forming a part of this specification.

My invention has relation to an improvement in wood-screws; and it consists in the novel form of its parts, whereby it is rendered capable of being driven into wood without cutting the fibers thereof.

This drive-screw is so constructed that it can be driven into wood like a nail or spike, but is capable of being removed therefrom only by rotation on its axis. Its general form is that of an ordinary wood-screw, in that it has a head, a threaded shank, and a point.

*d* represents the head of the screw, which may be circular and grooved, or square, or in any other of the usual forms. From its junction with the head the shank is usually made slightly tapering to the commencement of the curved surface of the point.

*b b* represent the thread, which is of small pitch, and so formed that a section of it made by a plane passing through the axis of the shank will be nearly, if not quite, a right-angle triangle, having its base toward the head of the bolt, the salient angular edge of the thread coinciding with the imaginary conical or cylindrical surface which connects the two ends of the shank. Preferably, also, the inclined surface of the thread, forming the hypotenuse of the triangle, rises in each coil immediately from the inner end of the base of the next lower coil, so as to leave no cylindrical or conical space between the coils, all as shown in the drawings.

The point *a* may be made conoidal, (its base being of the same diameter as the lower end of the shaft of the shank,) and extend from its base by a gradual curve to its extremity *c*.

From this construction the screw, when driven into the wood, will part the fibers thereof, and will not cut or lacerate them, as is usual with screws as ordinarily made. Therefore the fibers will readily and firmly close over the square upper shoulder of the thread, and hold the screw to its place securely.

When it is desired to extract this drive-screw, this may be readily accomplished by rotating it upon its axis, in the manner of extracting an ordinary screw.

Having thus described my invention, what I claim, and desire to secure by Letters Patent, is—

1. A drive-screw having an angular thread of the character shown, and a conoidal point, the base of which is of the same diameter as the lower end of the shank, with which it immediately connects.

2. A drive-screw having an angular thread of the character shown, and a point which extends by a gradual taper from its base *e* to its extremity *c*.

Witness my hand this 11th day of December, 1877.

DAVID F. FETTER.

Witnesses:
B. S. CLARK,
M. F. CLIFTON.